Aug. 5, 1947.  C. FIELD  2,425,237
PNEUMATIC NOZZLE
Filed Feb. 19, 1943  3 Sheets-Sheet 2
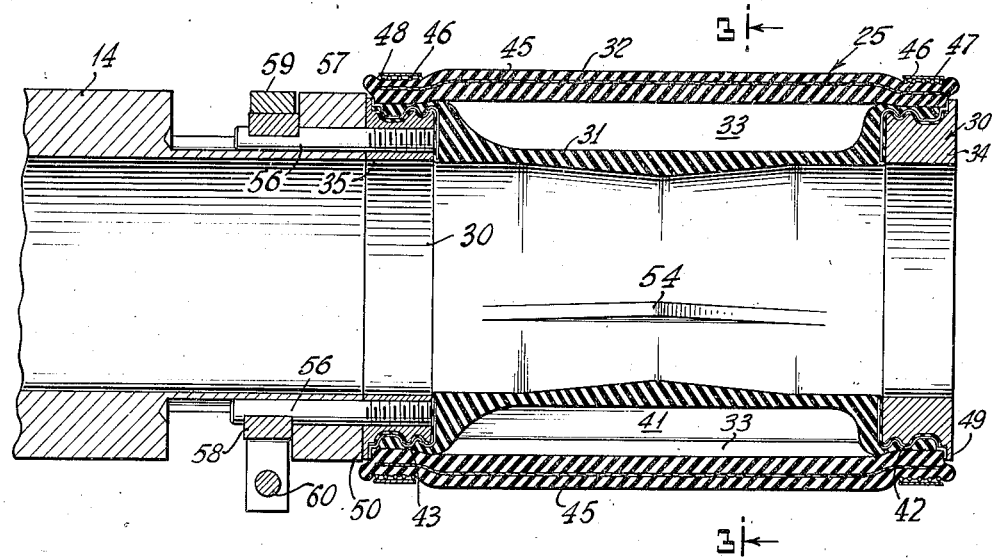
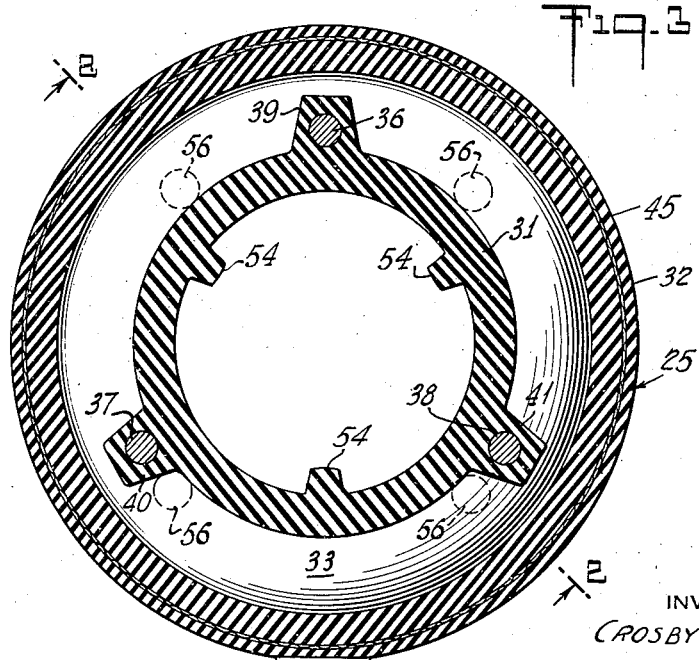
INVENTOR
CROSBY FIELD.
BY
Blair, Curtis & Hayward
ATTORNEYS Aug. 5, 1947.  C. FIELD  2,425,237
PNEUMATIC NOZZLE
Filed Feb. 19, 1943  3 Sheets-Sheet 3

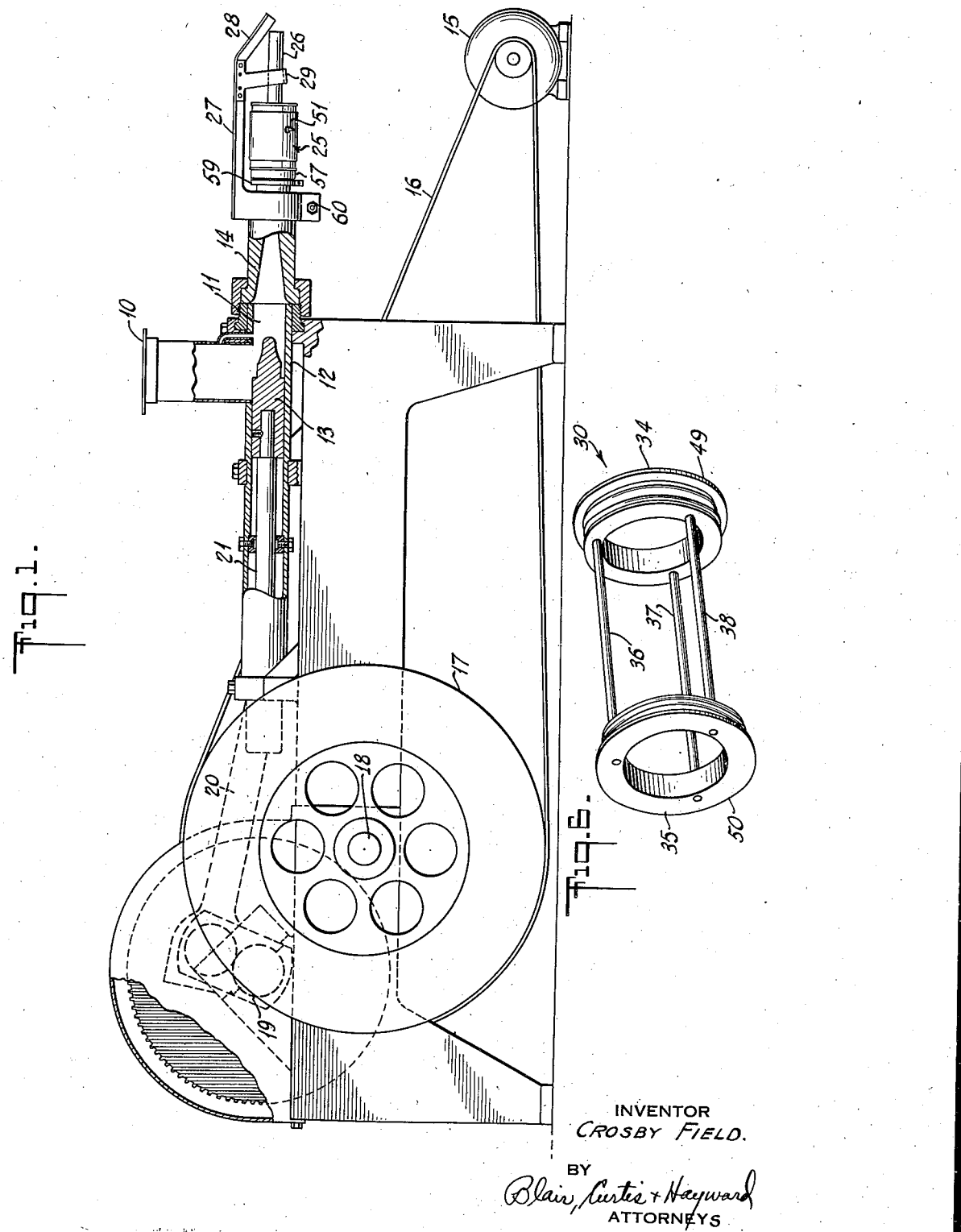

INVENTOR
CROSBY FIELD.
BY
Blair, Curtis + Hayward
ATTORNEYS

Patented Aug. 5, 1947

2,425,237

UNITED STATES PATENT OFFICE 2,425,237

PNEUMATIC NOZZLE

Crosby Field, Brooklyn, N. Y., assignor to Flakice Corporation, Brooklyn, N. Y., a corporation of Delaware Application February 19, 1943, Serial No. 476,384

2 Claims. (Cl. 18—12)

This invention relates to extrusion apparatus of the type wherein fragments or particles of a material are compacted into a solid mass by being forced into and through a converging nozzle. More particularly, the invention relates to a novel structure for exerting a relatively small resisting force on said mass after extrusion from said nozzle to insure effective consolidation of the fragments or particles while passing through the nozzle.

In a copending application, Serial No. 267,948, filed April 14, 1939, by Crosby Field there is disclosed and claimed an extruder particularly adapted for compacting and consolidating fragments of ice or other frozen fluids into a solid mass. In the embodiment disclosed therein, fragments of the material to be consolidated are forced by a reciprocating plunger into and through the bore of a rigid converging nozzle wherein the fragments are compacted into a solid mass, and then the consolidated mass in the form of a rod passes through a second nozzle which is flexible and preferably made of rubber or equivalent material. The second or auxiliary nozzle has an internal passage which is normally smaller than the diameter of the rod. As the consolidated mass emerges from the rigid nozzle, it expands the rubber nozzle to the diameter of the bore of the rigid nozzle at its discharge end, and thereafter the rubber nozzle exerts a relatively small but continuous resisting force on the rod passing therethrough.

As disclosed in the above-identified copending application, the flexible auxiliary nozzle performs at least two functions: it initially closes off the discharge opening of the rigid nozzle to an extent sufficient to cause enough pressure to be built up within the rigid nozzle to effectively consolidate the fragments therein when the extruder is first placed in operation; and while the extruder is in operation, it exerts a continuous relatively small resisting force on the emerging rod, and insures satisfactory consolidation at all times. It is an object of the present invention to provide an improved type of flexible nozzle for exerting such a resisting force on a mass continually extruded from a rigid converging nozzle.

The many objects and advantages of the present invention may best be appreciated by referring to the accompanying drawings which illustrate one embodiment of the invention and wherein, Figure 1 is a general elevation view partly in section of extrusion apparatus of the type disclosed in the copending application referred to above, with an auxiliary nozzle embodying the invention of the present application substituted for the flexible nozzle disclosed in the prior application;

Figure 2 is an axial section of the flexible nozzle and the discharge end of the rigid nozzle taken on the line 2—2 of Figure 3 and showing the flexible nozzle in a non-operating deflated condition;

Figure 3 is a vertical section taken along lines 3—3 of Figure 2 and showing the nozzle in its non-operating deflated condition;

Figure 6 is a perspective view of a spider about which the flexible part of the nozzle is molded.

Figure 4:
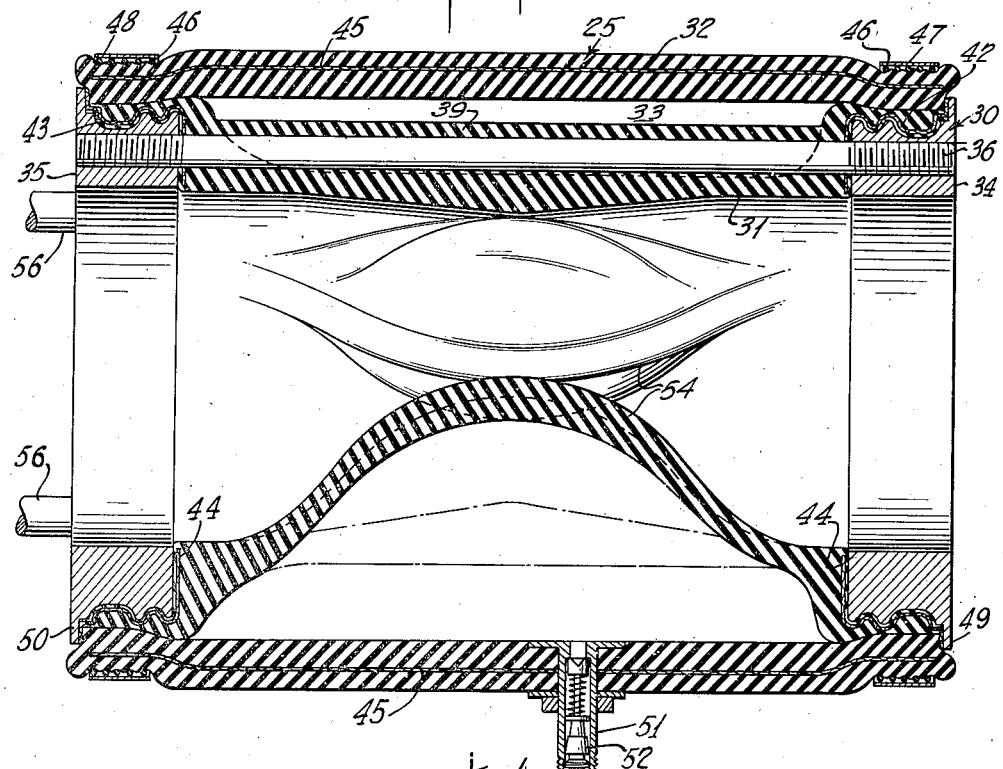
Figure 4 is an axial vertical section taken along lines 4—4 of Figure 5 and showing the flexible nozzle in its operating inflated condition.

Referring to the drawings, particularly to Figure 1, the apparatus shown therein comprises, in general, a suitably driven reciprocating plunger 13 which forces ice fragments fed from a chute 10 into and through a rigid converging nozzle 14 to compress and weld them into a solid bar or rod. The fragments enter the apparatus at the top of the chute 10 and pass downwardly into a plunger chamber 11 within the cylindrical barrel 12. The fragments may be fed to the chute 10 by any suitable feeding device (not shown). Within the plunger chamber 11 the tapered plunger 13 is caused to reciprocate by suitable driving mechanism. Periodically, the plunger 13 moves forward (to the right as shown in Figure 1) to force the fragments in plunger chamber 11 into the large end of the rigid converging nozzle 14 and at the same time compress and consolidate the fragments into a solid mass which leaves the nozzle as a continuous solid rod 26.

After leaving the discharge end of rigid nozzle 14, the rod of consolidated material passes through an auxiliary flexible nozzle 25 which is described in detail below. The rod 26 after emerging from the auxiliary nozzle 25 is broken into pieces of predetermined length by a breaker arm 27, mounted on nozzle 14 and comprising a diagonal member 28 which forces the leading end of the rod downwardly against a fulcrum 29 in such manner that a section of the rod of predetermined length is broken off. The position of the fulcrum is made adjustable so that the length of the sections may be varied as desired.

Power to operate the plunger is supplied by an electric motor 15 which is connected by a belt 16 to one of a pair of fly wheels 17 (only one of which is shown) mounted on opposite ends of a shaft 18. Shaft 18 is suitably geared to crank shaft 19, which, through connecting rod 20 and plunger rod 21, drives the plunger 13.

Referring now to Figures 2, 3, 4, and 6, which show the construction of the flexible nozzle 25, the nozzle comprises generally a metal framework or spider 30 (Figure 6), a flexible inner sleeve 31 (Figures 2 and 4) forming a conduit through which the rod 26 passes and a relatively rigid outer sleeve 32 which cooperates with the inner sleeve 31 to form a chamber or pocket 33 in which an elastic fluid such as air under pressure may be locked. The pneumatic pressure in chamber 33 causes sleeve 31 to bulge inwardly (Figure 5) to form a yieldable restriction to the passage of the rod 26 emerging from the rigid nozzle 14.

As best shown in Figure 6 the spider 30 comprises a pair of metal rings or flanges 34 and 35 connected by a plurality of rods 36, 37, and 38 equally spaced around the circumference of the flanges. The rods are provided with right-hand threads at one end and left-hand threads at the other to facilitate assembly of the spider.

The inner sleeve 31 is formed of a flexible material preferably of rubber or rubber-like material, and is molded and vulcanized around the spider with portions of the spider embedded within the rubber. As shown in Figure 3 the rods 36, 37, and 38 are embedded in the projecting ridges 39, 40, and 41 of the sleeve 31. Thus the sleeve is held rigid along the three ridges where the rods are located and may flex inwardly only along the intermediate valleys.

The ends of the inner sleeve 31 fit over the binding grooves 42 and 43 of rings 34 and 35 as shown in Figures 2 and 4. Near its ends the sleeve 31 is provided with a ply of reinforcing fabric 44 to strengthen the rubber and prevent it from tearing. Outer sleeve 32 fits over inner sleeve 31 and spider 30 in the manner shown in Figures 2 and 4 and is provided with a layer of reinforcing fabric 45 which extends nearly the whole length of the sleeve and renders it substantially inflexible. The ends of sleeve 32 fit inside of the shoulders 49 and 50 of flanges 34 and 35 in such manner that the shoulders prevent lateral dislocation of the sleeve. The ends of sleeve 32 are tightly bound to the flanges 34 and 35 of the spider with the binding wire 46 and the binding wire is covered by metal strips 47 and 48 which are soldered in place to provide additional reinforcement. The firm binding at the ends of sleeves and the rigidity of the spider help to prevent lateral displacement of sleeve 31 due to pressure exerted by the advancing mass of consolidated material.

As previously pointed out, the nozzle 25 is pneumatically inflatable. Air under pressure may be introduced into the chamber 33 between the sleeves 31 and 32 through an air inlet 51 (see Figure 4) which is provided with a suitable valve 52, which may be of the type commonly used in the tubes of pneumatic tires. When air is introduced into the space 33, the portions of sleeve 31 between the rods 36, 37, and 38 are deflected inwardly and form a series of bulges (best shown in Figures 4 and 5) which substantially fill up the passageway through the sleeve. Along each bulging portion at the point of maximum deflection there is a projecting ridge 54 which acts as a tread to bear the brunt of the wear resulting from the passage of the rod of material through the nozzle.

As pointed out above, the passageway through the auxiliary nozzle is blocked off until such time as sufficient pressure is built up in the rigid nozzle to consolidate the fragments therein. As the consolidated mass emerges from the rigid nozzle, it forces the sleeve 31 back substantially to its original unstressed position and thereafter the treads 54 bear against the rod 26 to exert a continuous resisting force thereon. It should be noted that during normal operation of the extruder the rubber sleeve is under very little, if any, tension and hence is less subject to elastic fatigue than it would be if it were continually stretched.

The nozzle 25 may conveniently be connected to and supported by rigid nozzle 14. Referring to Figures 2 and 3, the flange 35 of spider 30 is provided with a plurality of studs 56 (in this case four) which pass through a series of holes in a shoulder 57 of nozzle 14. The studs 56 are notched to receive a split ring 58 which fits into the notches in studs 56. The notches are so located that ring 58 fits snugly against the shoulder 57 in such manner as to hold the auxiliary nozzle in operative position. The split ring 58 is held in position by a clamping band 59 which passes around the periphery of ring 58 and is secured by the bolt 60. Thus, the auxiliary nozzle is securely held in operative position with respect to the rigid nozzle.

Figure 5:
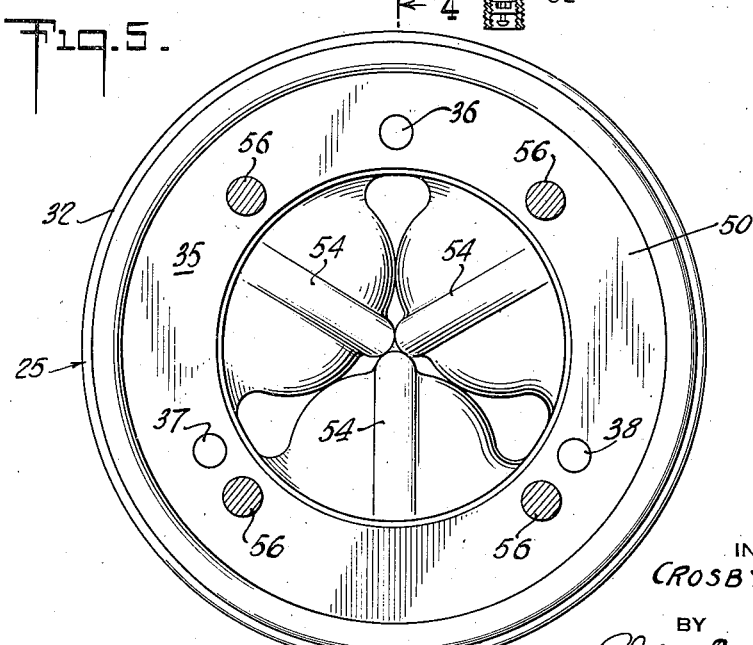
Figure 5 is an end view of the discharge end of the inflated nozzle.

The operation of the device should be apparent from the foregoing description. Air is introduced into annular space 33 to cause sleeve 31 to bulge inwardly as shown in Figures 4 and 5 and to substantially close the passageway through the sleeve. This blocks the discharge end of the rigid nozzle to an extent sufficient to cause pressure to be built up within the rigid nozzle to effect consolidation and compacting of the fragments therein. As the consolidated mass forces its way through the auxiliary nozzle, the bulging portions of the inner sleeve are forced back toward their deflated positions and the treads 54 bear against the rod of material passing therethrough and exert on the rod a continuous resisting force. The magnitude of the resisting force may be varied by adjusting the pneumatic pressure to the desired value and this adjustment may, if desired, be made while the extruder is in operation. Thus, the resisting force may be easily adjusted to the optimum value for the particular material being compacted.

From the above description it is apparent that the present invention provides an unusually effective and durable structure for exerting a resisting force on a consolidated mass being extruded from a rigid nozzle. The construction is such that the discharge from the rigid nozzle is substantially completely blocked off during the initial period when pressure is building up in the rigid nozzle. As the consolidated mass moves forward into the auxiliary nozzle the obstructing portions of the nozzle yield freely in response to force exerted by the advancing mass. The change in the pressure exerted by the auxiliary nozzle on the mass during the period when the mass is forcing its way through the nozzle is relatively small because the yieldability of the inner sleeve depends upon the elasticity of an elastic fluid which has a smaller elastic modulus than, for example, rubber. Thus the pressure exerted by the nozzle on the mass remains more nearly constant.

Furthermore, the nozzle of the present invention is unusually durable since during normal operation of the extruder the rubber portions of the nozzle are in substantially unstretched condition and hence are less subject to loss of elasticity through elastic fatigue than they would be if they were continually stretched. The portions of the nozzle in contact with the moving rod are provided with treads which bear the brunt of the wear, thus increasing the useful life of the nozzle.

The specific embodiment of the present invention above described may be used with particular advantage in conjunction with the compacting of ice fragments in extrusion apparatus of the type disclosed. However, the present invention may also be usefully employed with other types of extruders.

Since many embodiments might be made of the present invention and since many changes might be made in the embodiment here described, it is to be understood that the above description is to be interpreted as illustrative only and not in a limiting sense.

I claim:

1. In extrusion apparatus of the type wherein fragments of a material are compacted into a solid mass by forcing said fragments into and through the bore of a nozzle, means for exerting a resisting force on said mass after it leaves said nozzle, comprising, a pair of ring-shaped members, a plurality of equally spaced rods interconnecting said ring-shaped members, a rubber conduit through which said mass is forced after it leaves said nozzle, said rubber conduit being vulcanized around said members and said rods, a cylindrical casing surrounding said rubber conduit and cooperating with said rubber conduit and said members to form an annular space, means for introducing air under pressure into said annular space to cause said rubber conduit to bulge inwardly at a plurality of equally spaced points between said rods to form inwardly extending bulges in said rubber conduit whereby said bulges bear against said mass with substantially equal radial forces and exert a resisting force on said mass as it passes through said conduit.

2. In extrusion apparatus of the type wherein fragments of a material are compacted into a solid mass by forcing said fragments into and through the bore of a rigid nozzle, an auxiliary nozzle for exerting a resisting force on said mass after it leaves said nozzle, comprising, a cylindrical metal framework, a rubber conduit through which said mass is forced after leaving said rigid nozzle, said rubber conduit being vulcanized to said framework, a casing enclosing said framework and said conduit and forming therewith an enclosed space, means for introducing air under pressure into said enclosed space to stretch said rubber conduit and cause it to form inwardly extending bulging portions which reduce the cross-sectional area of said conduit, each of said bulging portions being provided with a tread which bears against said mass, whereby the treads on said bulging portions exert a resisting force upon said mass as it passes through said conduit.

CROSBY FIELD.

REFERENCES CITED

The following references are of record in the file of this patent:

UNITED STATES PATENTS

| Number | Name | Date |
| --- | --- | --- |
| 1,163,448 | Penkala | Dec. 7, 1915 |
| 2,307,575 | Davis | Jan. 5, 1943 |
| 2,332,170 | Sapp | Oct. 19, 1943 |
| 157,466 | Townsend | Dec. 8, 1874 |